US012763710B2

(12) United States Patent
Jensen et al.

(10) Patent No.: US 12,763,710 B2
(45) Date of Patent: Oct. 13, 2026

(54) METHOD FOR OPERATING A VARIABLE SPEED DRIVE FOR DRIVING AN ELECTRIC MOTOR AND VARIABLE SPEED DRIVE FOR EXECUTING THE METHOD

(71) Applicant: Danfoss Drives Oy, Vaasa (FI)

(72) Inventors: Klaus Jensen, Sønderborg (DK); Simo Häkli, Nordborg (DK); Anton Hannibal Chester Smith, Rockford, IL (US); Peter Scavenius Andersen, Sønderborg (DK)

(73) Assignee: DANFOSS DRIVES OY, Vaasa (FI)

( * ) Notice: Subject to any disclaimer, the term of this patent is extended or adjusted under 35 U.S.C. 154(b) by 231 days.

(21) Appl. No.: 18/425,422

(22) Filed: Jan. 29, 2024

(65) Prior Publication Data

US 2024/0275316 A1 Aug. 15, 2024

(30) Foreign Application Priority Data

Feb. 6, 2023 (DE) ......................... 102023102818.9

(51) Int. Cl.
*H02P 21/22* (2016.01)
*H02P 21/00* (2016.01)
(Continued)

(52) U.S. Cl.
CPC ........ *H02P 21/0003* (2013.01); *H02P 21/141* (2013.01); *H02P 21/18* (2016.02); *H02P 21/20* (2016.02); *H02P 25/028* (2013.01)

(58) Field of Classification Search
CPC ...... H02P 21/22; H02P 21/0089; H02P 21/20; H02P 21/141; H02P 21/18; H02P 25/028; H02P 21/0003
(Continued)

(56) References Cited

U.S. PATENT DOCUMENTS 11,223,317 B2 1/2022 Yoo
11,239,772 B1 * 2/2022 Bojoi ...................... H02P 21/22
(Continued)

OTHER PUBLICATIONS

Khan, Waqar Ahmed; Aalto University: Torque maximizing and flux weakening control of synchronous machines. 2016. S. 1-55. URL: https://core.ac.uk/download/pdf/80719727.pdf [Dec. 13, 2023].

*Primary Examiner* — Gabriel Agared
(74) *Attorney, Agent, or Firm* — McCormick, Paulding & Huber PLLC

(57) ABSTRACT

A method for operating a variable speed drive for driving an electric motor, in particular a synchronous motor, includes calculating a look-up table for a given motor, said look-up table having torque input values and flux input values referenced to current magnitude values and current angle values at the max torque per amp (MTPA) points and at increasing angular deviations from the MTPA points, wherein the current magnitude values and current angle values are out-put signals for controlling the motor; and outputting current magnitude values and current angle values as a function of torque input values and/or flux input values at the max torque per amp (MTPA) point to the motor as control variables, if the associated flux values are smaller than or equal to a flux limit; or outputting current magnitude values and current angle values as control variables, such that the associated flux values do not exceed a flux limit. The disclosure further discloses a variable speed drive for executing the method.

20 Claims, 13 Drawing Sheets

(51) Int. Cl.
*H02P 21/14* (2016.01)
*H02P 21/18* (2016.01)
*H02P 21/20* (2016.01)
*H02P 25/028* (2016.01)

(58) Field of Classification Search
USPC .................................................... 318/400.02
See application file for complete search history.

(56) References Cited

U.S. PATENT DOCUMENTS

| | | | | |
|---|---|---|---|---|
| 2017/0085200 | A1* | 3/2017 | Campbell | H02P 27/06 |
| 2017/0317635 | A1* | 11/2017 | Campbell | H02P 21/02 |
| 2019/0173407 | A1* | 6/2019 | Wang | H02P 6/21 |
| 2021/0155285 | A1* | 5/2021 | Li | B62D 5/046 |
| 2021/0273505 | A1* | 9/2021 | Jing | H02P 21/0089 |
| 2022/0231624 | A1* | 7/2022 | Balamurali | H02P 6/08 |
| 2022/0376642 | A1* | 11/2022 | White | H02P 21/22 |

* cited by examiner

Classified as Business

Fig. 12

Inputs:

| | |
|---|---|
| Reference torque | Variable reference signal |
| Flux limit | Variable limit calculated from speed and available voltage |
| Current limit | Variable configurable limit |
| Torque LUT | Pre-loaded lookup table of torque as function of current and angle |
| Flux LUT | Pre-loaded lookup table of flux as function of current and angle |
| Current increment | Current indices used in lookup table |
| Angle increment | Angle indices used in lookup table |

Outputs:

| | |
|---|---|
| Ref current magnitude | Magnitude used for d and q reference currents |
| Ref current angle | Angle used for d and q reference currents |
| Motor flux | Actual table value of motor flux |
| Max torque | Maximum obtainable torque with given current limit |
| Torque limit flag | Indicator in case reference torque cannot be provided |

METHOD FOR OPERATING A VARIABLE SPEED DRIVE FOR DRIVING AN ELECTRIC MOTOR AND VARIABLE SPEED DRIVE FOR EXECUTING THE METHOD

CROSS-REFERENCE TO RELATED APPLICATION

This application claims foreign priority benefits under 35 U.S.C. § 119 from German Patent Application No. 102023102818.9, filed Feb. 6, 2023, the content of which is hereby incorporated by reference in its entirety.

TECHNICAL FIELD

The present invention is directed at a method for operating a variable speed drive for driving an electric motor, in particular a synchronous motor.

The invention is also directed at a variable speed drive for executing the method.

BACKGROUND

Known methods for operating variable speed drives for electric motors may employ field weakening functions, which rely solely on negative d-current injections based on voltage commands. These known methods may encounter a number of problems during operation.

Firstly, the d-current injection is a reactive step. This means that it corresponds to reacting to a reference value, which has already exceeded a certain limit. Secondly, the d-current injection may create an additional torque for certain types of motors, which could unintentionally accelerate the motor further into field weakening conditions. This in return would force a superordinate or upstream controller, such as a speed PI controller, to counteract the unintentional motor acceleration. The field weakening function of known methods is therefore not torque neutral.

SUMMARY

The aim of the present invention is to overcome these problems and to provide an improved method for operating a variable speed drive. This aim is achieved by a method according to the present disclosure and a variable speed drive according to the present disclosure. Preferable embodiments of the invention are subject to the dependent claims.

According to the present disclosure, a method for operating a variable speed drive for driving an electric motor is provided. The motor may be a synchronous motor. The method comprises the steps of:

- calculating a look-up table for a given motor, said look-up table comprising torque input values and flux input values referenced to current magnitude values and current angle values at the max torque per amp (MTPA) points and at increasing angular deviations from the MTPA points, wherein the current magnitude values and current angle values are out-put signals for controlling the motor; and
- outputting current magnitude values and current angle values as a function of torque input values and/or flux input values at the max torque per amp (MTPA) point to the motor as control variables, if the associated flux values are smaller than or equal to a flux limit; or

- outputting current magnitude values and current angle values as control variables, such that the associated flux values do not exceed a flux limit.

The current magnitude values and current angle values may be output as a function of torque input values and/or flux input values at an angular deviation from the MTPA point. The current magnitude values and current angle values may be output to the motor as control variables, if the associated flux values are greater than a flux limit.

According to the invention, the present invention's current reference function, including field weakening, is the same for all synchronous motor types and it is torque neutral. It is therefore not necessary to adapt the current reference function to different kinds of synchronous motors, which facilitates the use of the present method.

In a preferred embodiment of the invention, the output current magnitude is smaller than or equal to a current limit and/or the flux limit is calculated from the motor speed at the available DC link voltage.

In another preferred embodiment of the invention, if the associated flux values are greater than the flux limit, current magnitude values and current angle values are output, which correspond to current magnitude values and current angle values at an angular deviation from the MTPA points, at which a torque limit and the flux limit are maintained.

In another preferred embodiment of the invention, the look-up table is an interpolating look-up table referencing torque inputs and flux inputs, in particular from a speed controller of the drive, to reference current vector outputs, comprising the current magnitude values and current angle values.

In another preferred embodiment of the invention, the current magnitude values and current angle values at increasing angular deviations from the MTPA points are increased such that for each increment of current magnitude, in particular in increments of 2%, the current angle is varied from 800 to 180°, in particular in steps of 1°. The current magnitude increments may be in a range between 1% and 5%. The current angles may be varied in steps of between 0.5° and 5°.

In another preferred embodiment of the invention, the output current magnitude values and out-put current angle values are converted into d- and q-axis reference values.

In another preferred embodiment of the invention, the look-up table is created during initialization. The initialization of the drive occurs when the drive is powered up or when the configuration of the drive changes due to e.g. a parameter modification.

In another preferred embodiment of the invention, only a part of the look-up table is searched for generating consecutive current magnitude values and current angle values, wherein a current index and angle index of the last used current magnitude value and current angle value is stored and the search for the next current magnitude value and current angle value is limited around these indices, in particular to three current indices below and above and to five angle indices below and above the respective indices of the last used current magnitude value and current angle value.

The invention is also directed at a variable speed drive according to the present disclosure. The variable speed drive is provided for driving an electric motor and comprises a computation unit and a program for executing the method according to the present disclosure.

BRIEF DESCRIPTION OF THE DRAWINGS

Further preferable embodiments and features of the invention are described with reference to the figures. The figures show:

FIG. 12: definitions of inputs and outputs of the function shown in FIG. 12.

DETAILED DESCRIPTION

Figure 1:
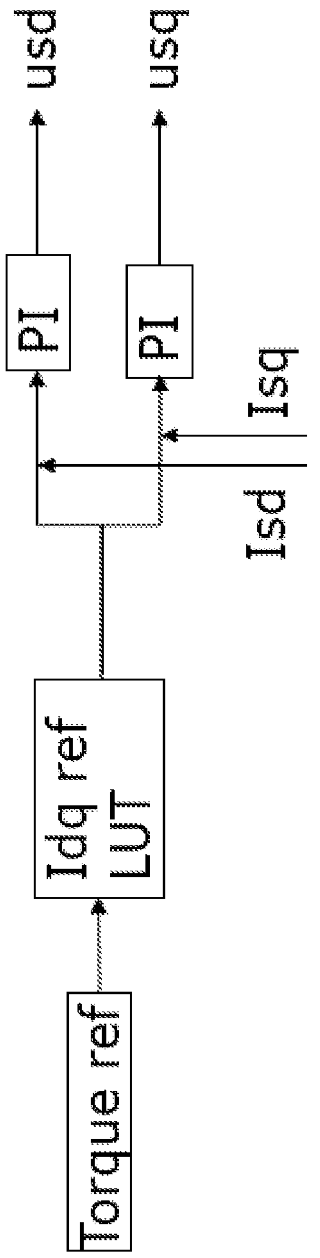
FIG. 1: general overview of the invention.

FIG. 1 shows general overview of the invention. With the advent of more types of salient pole synchronous motors, the original IPM MTPA (Interior Permanent Magnet, Max Torque Per Ampere) method used for current reference generation is showing deficiencies, mainly since parameter saturation is only partially considered. One major benefit of the present invention is that no reactive field weakening controller is required.

Figure 2:
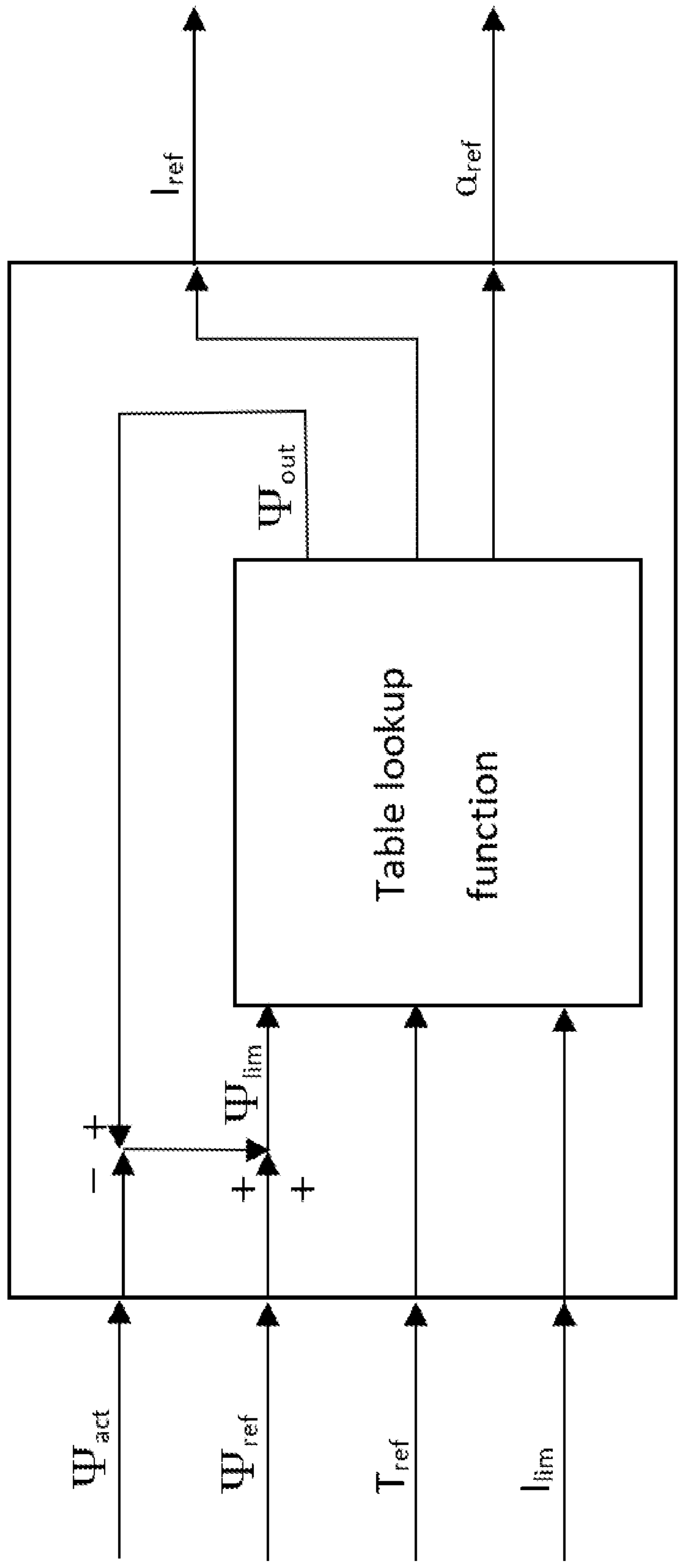
FIG. 2: schematic function interfaces.

FIG. 2 is a schematic view of the function interfaces. The present invention's look-up tables contain data points, that the function searches through. These look-up tables are created when the drive initializes. Once created, the look-up tables stay constant for a given motor. The torque input and flux input are inputs to the function, from which the output current magnitude and cur-rent angle are calculated, using the tables. FIG. 2 shows (variable) inputs and outputs of the method. The look-up tables may be contained within the function.

Figure 3:
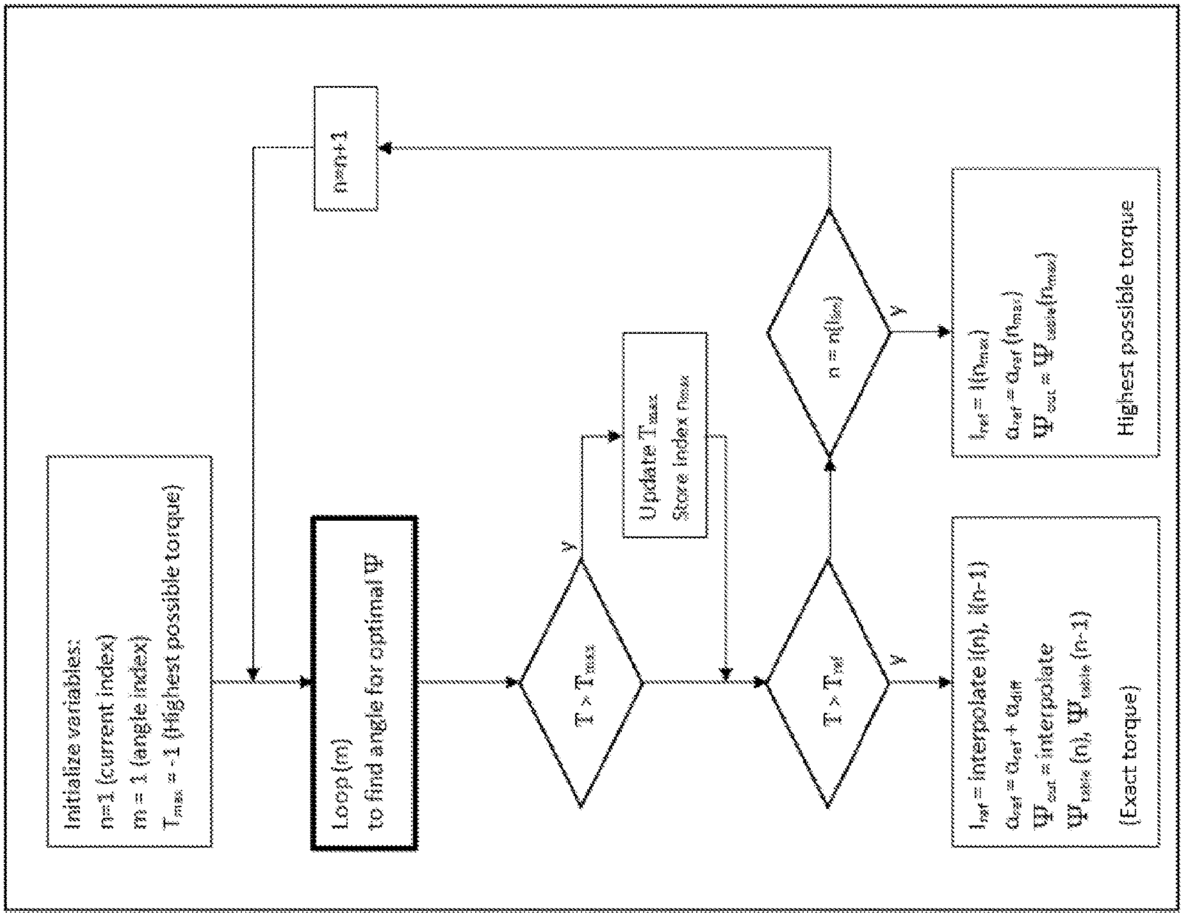
FIG. 3: flow chart of the table lookup function in FIG. 2.
Figure 4:
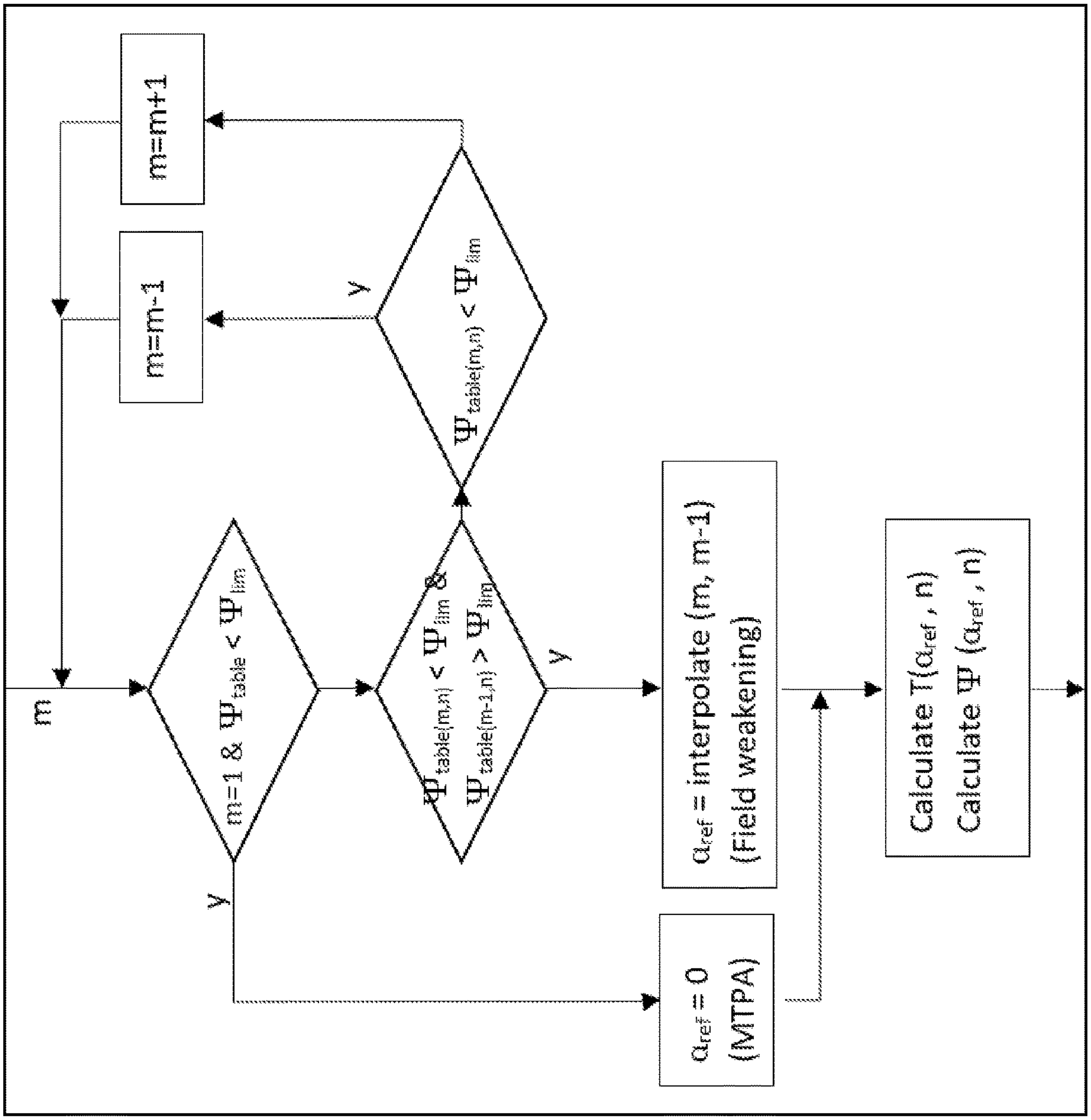
FIG. 4: flow chart of the method steps for finding optimal flux of FIG. 3.

FIG. 3 is a flow chart of the table lookup function in FIG. 2. FIG. 4 is a flow chart of the method steps for finding angles for optimal flux of FIG. 3, whereby the optimal flux corresponds to the flux not exceeding the flux limit according to the present invention.

True MTPA operation is a requirement to operate non-standard synchronous motor types. Moreover, the original field weakening function for PM motors is based on negative d-axis cur-rent injection based on voltage requirement. This d-axis current reference is combined with the q-current reference determined by the speed controller, and thus provides two individual references, one of which influences machine voltage and the other machine torque. This concept works well with machines that have no saliency.

However, when even modest saliency is present, the d-axis current will create additional torque, influencing the speed controller, which in turn influences the q-current reference. Thus, this method is not torque neutral, as the speed controller will be affected by field weakening, which can lead to instability.

The present invention corresponds to a current reference concept, which provides optimal cur-rent generation (MTPA) in normal operation and torque neutral field weakening for any level of saliency and saturation. Thus, with the presently described concept, it is not necessary to specify which synchronous motor types is being operated.

A common feature for the MTPA and the field weakening function is that they are both based on pre-calculated look-up tables and using interpolation. The tables are generated from the motor data, which in turn originate from either (detailed) data sheet values or other means, for example a motor parameter identification function. The number of configuration parameters (saliency, saturation) are the same for every motor type; which implies that it is e.g. necessary to specify both a saturated and a non-saturated inductance parameter even if no saturation is present in the motor.

The MTPA is an interpolating look-up table with a torque input (typically from the speed controller) and a reference current vector output (magnitude and angle). The table is populated during initialization with the optimum current magnitude i and current angle α for a given torque input. More specifically, the tables are generated from the general torque equation being a function of both current magnitude and angle as shown in equation 1.1:

$$\begin{aligned} T(i, \alpha) &= \frac{3Z_{pp}}{2}(\Psi_d(i, \alpha)i_q - \Psi_q(i, \alpha)i_d) \\ &= \frac{3Z_{pp}}{2}((\Psi_{PM} + L_d(i\cos(\alpha)))i\sin(\alpha) - \\ &\quad L_q(i\sin(\alpha))i\cos(\alpha)) \end{aligned} \qquad \text{Equation 1.1}$$

Note that a is the angle between the current vector and the d-axis. i and α in are then increased in a "nested" fashion; for each i increment of typically 2% of Inom, α is varied from lower than 80 to 180 degrees in steps of e.g. 1 degree. For each current increment, the optimal torque and the associated angle and current are stored.

Figure 5:
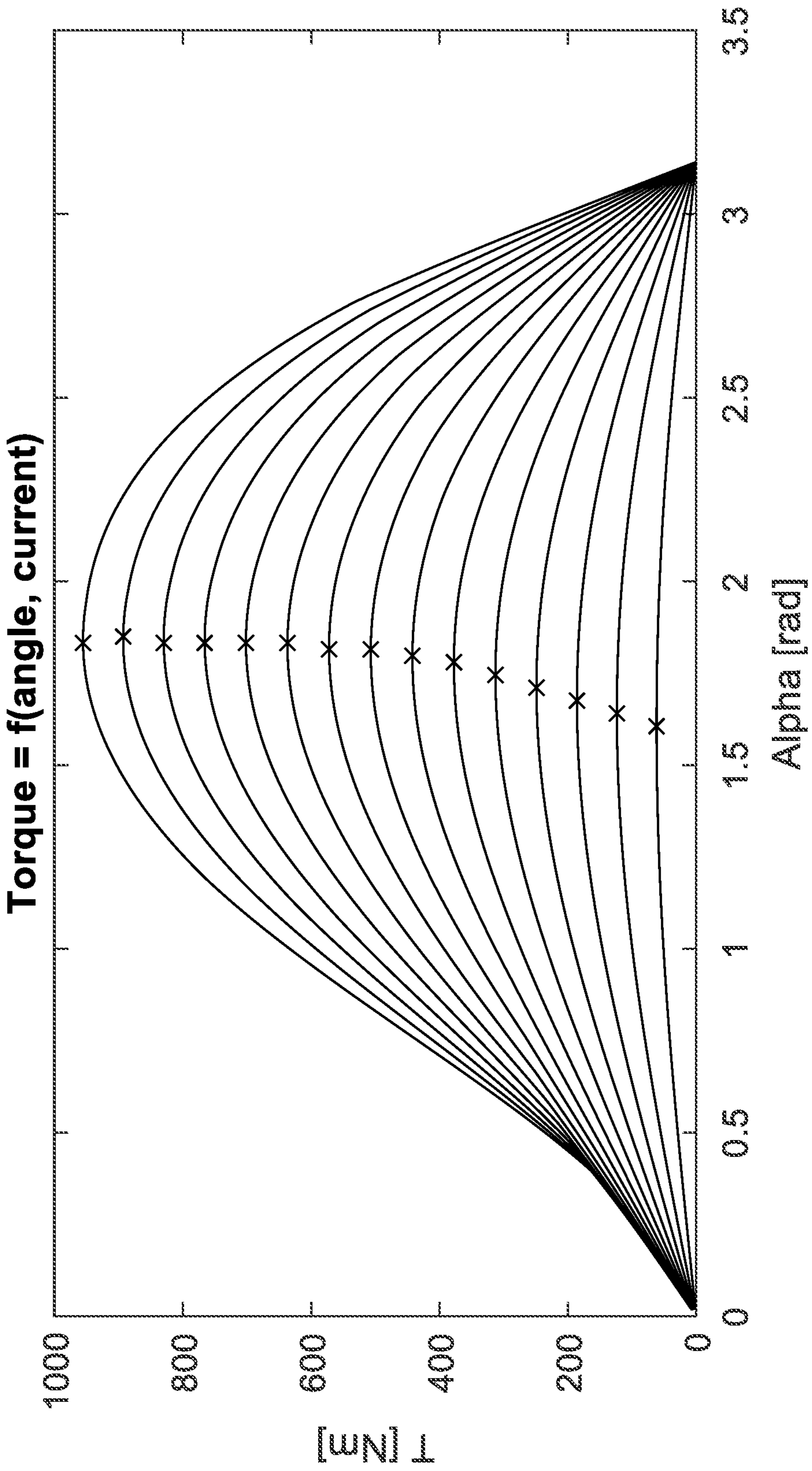
FIG. 5: graph showing torque as a function of a for increasing current levels.

FIG. 5 shows the torque as a function of a for increasing current levels. The black trace is the maximum torque trajectory, found iteratively.

Figure 6:
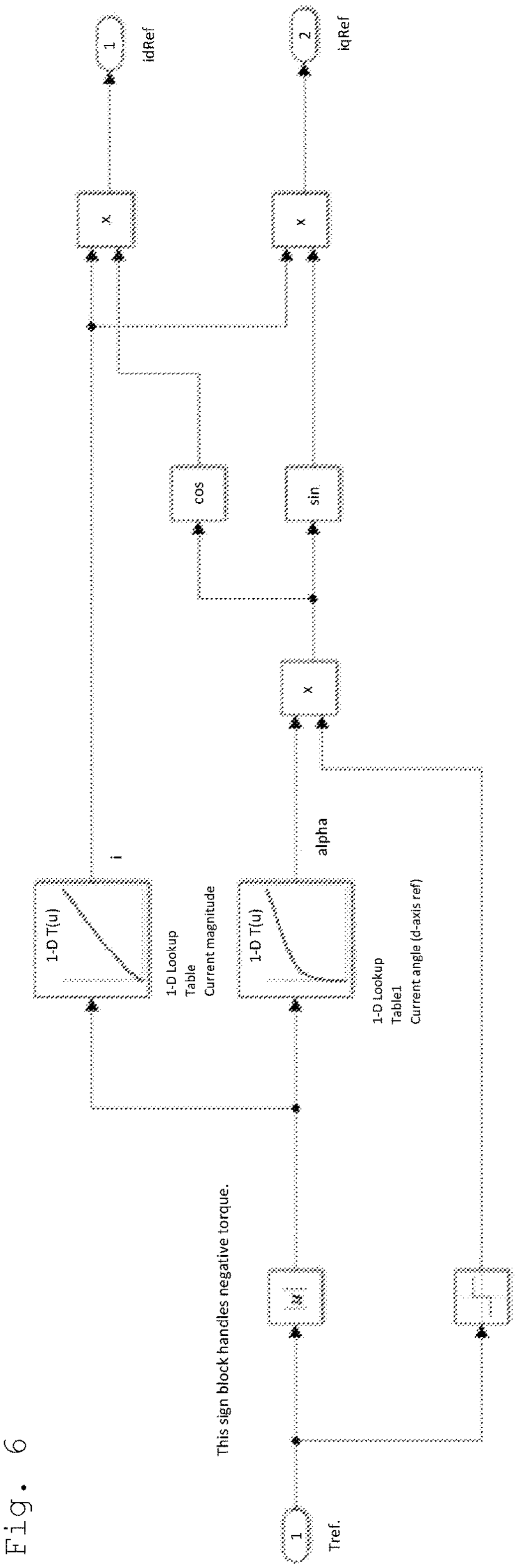
FIG. 6: principle of the table-based MTPA functionality.

The current incrementation continues until the highest drive current (drive EEPROM value) is reached. Therefore, extrapolation is not needed. The principle of the table-based MTPA functionality is shown in FIG. 6, where a torque input is converted into a current magnitude and angle reference, which are finally converted to d- and q-axis reference values. The tables are only generated for positive torque. Negative torque is handled by changing the sign of the angle.

In the actual drive code implementation, the MTPA and field weakening functionality is combined. The tables may only be generated for positive torque. Negative torque may be handled by changing the sign of the angle.

The general concept with the field weakening functionality is pro-active, i.e. it will generate cur-rent references, which ensure that maximum voltage is not exceeded. This is achieved by observing the available amount of flux, which can be generated at a given speed of the motor. Therefore, from the available DC link voltage, a flux limit is calculated as a function of speed.

When implementing the method, it is important to distinguish between resistive and reactive voltage drops—whereas the flux will create the reactive voltage drop, the resistive voltage drop is only determined by the current and the motor resistance. The dynamically calculated flux limit must be therefore compensated for the resistive voltage drop. The output of this module is the actual flux limit that the following functionality must obey. At the same time, the torque reference must be obeyed (when possible) and these two demands are also handled by look-up tables.

Like the previously described MTPA tables, the flux and toque tables are created during initialization. The torque calculation is already provided in above equation 1.1. Equation 1.2 below shows how the machine flux is calculated as a function of i and α:

$$\Psi_{dq}(i,\alpha) = \sqrt{\Psi_d{}^2(i,\alpha) + \Psi_q{}^2(i,\alpha)} = \sqrt{(\Psi_{pm} + L_d(i_d)\ i\ \cos(\alpha))^2 + (L_q(i_q)\ i\ \sin(\alpha))|} \quad \text{Equation 1.2}$$

Figure 7A:
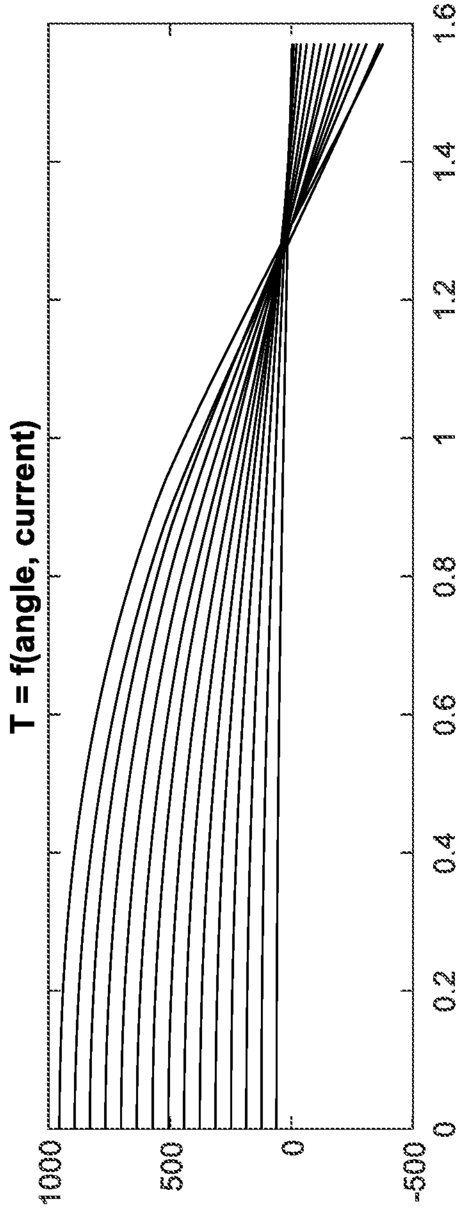
FIGS. 7*a* and 7*b*: examples for stored look-up tables.
Figure 7B:
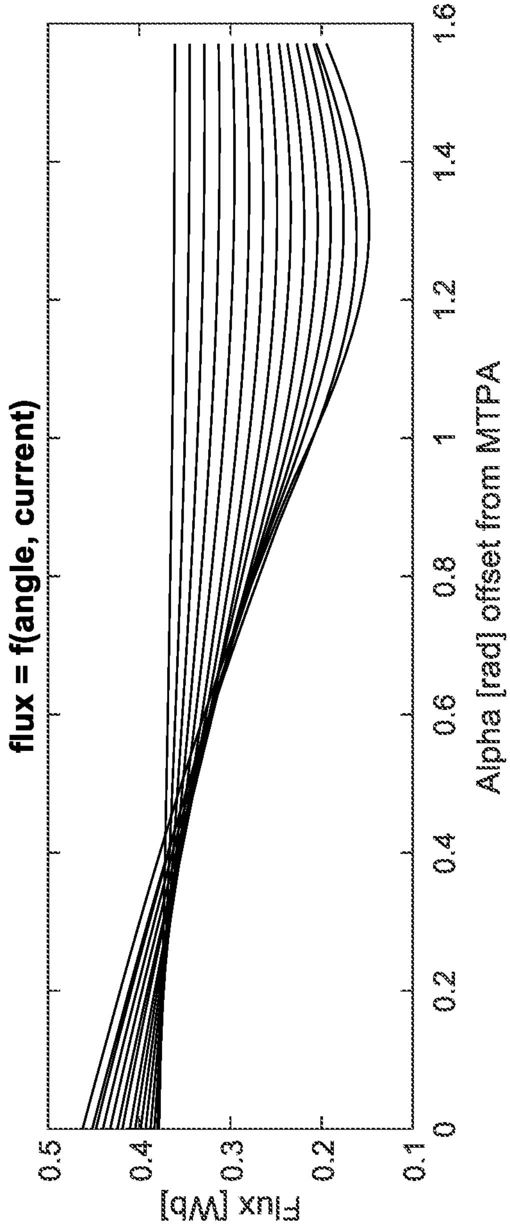

Only parts of the tables i.e. not the entire tables may be considered in any given outputting step of the method. Angles less than the MTPA angle are irrelevant since these operating points will create less torque with more flux. Hence, the MTPA angle is used as a base line and the tables offset from here. This is mainly to make look-up easier. Since the tables must be able to represent all machine types, they must cover the range from an MTPA angle of pi/2 (for SPMSM) to pi (all current in negative d), or in case of higher Ld than Lq, it might also start from an MTPA angle less than pi/2. The stored tables could look like depicted in FIGS. 7*a* and 7*b*. Note that the x-axis is an angle offset from the MTPA angle trajectory, which in this case would be larger than pi/2.

Since the function may rely on pre-calculated flux values, it is sensitive to machine parameter accuracy. To avoid entering field weakening too soon or too late, a parameter adaption may take place, based on the actual estimated value of flux. While the tables are fixed and cannot be manipulated, the flux limit is manipulated to reflect any discrepancy between table value and on-line calculation-based flux magnitude, typically from the flux observer.

For some variable speed drives, this value may already be available since it may be used in the position estimate. For other variable speed drives, it may be calculated in a similar manner, keeping in mind that only the magnitude of the flux is needed.

Figure 8:
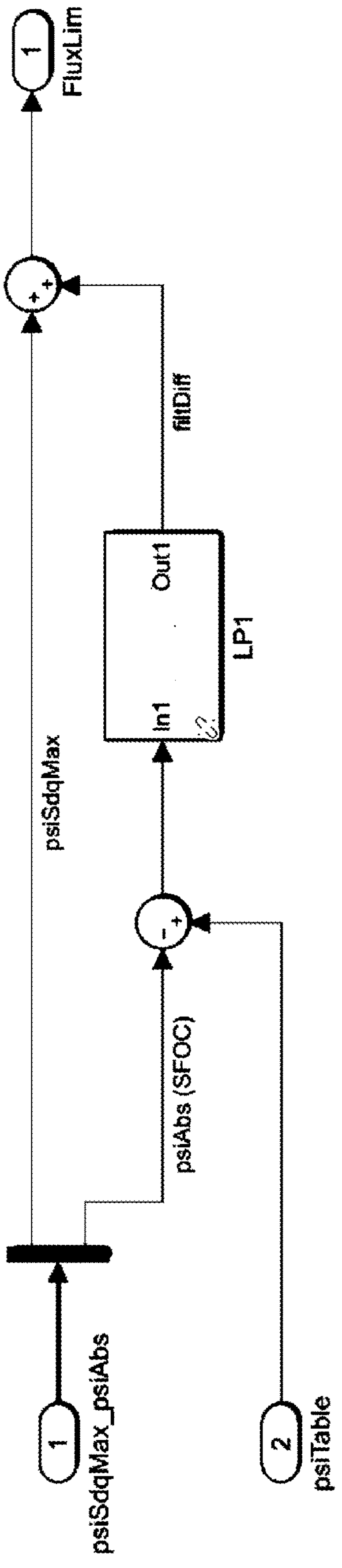
FIG. 8: example of parameter adaptation.

FIG. 8 shows how the feature could be implemented. In general, if the table flux is overestimated, the flux limit is increased accordingly, and vice versa. The LP1 in FIG. 8 is a low pass filter, the time constant of which is found empirically.

Figure 9:
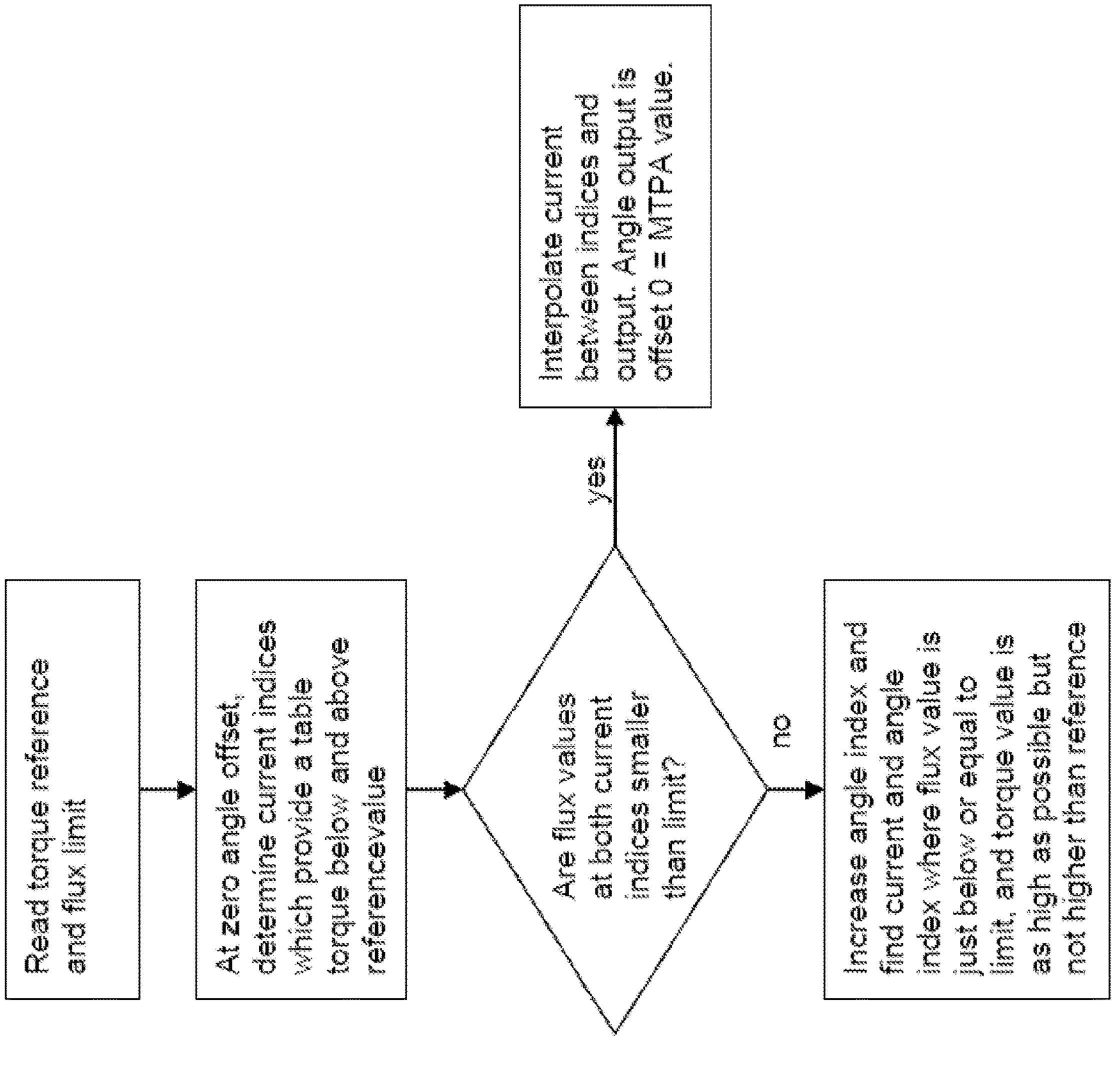
FIG. 9: flow chart of field weakening look-up functionality.

The field weakening functionality runs after the MTPA function. The lookup table is accessed in every control cycle, also when field weakening is not needed. In broad terms, the combined cur-rent reference function always finds the MTPA point first. In case flux limits are not compromised, the function exits immediately and thus returns current references corresponding to the MTPA point. If flux limits are compromised, the table lookup functionality will return current references that maintain both torque (where possible) and flux, with as small reference current vector as possible. FIG. 9 shows the overall functionality.

If none of the four criteria for a found point are found, the last found current index may be used, and the angle may be set to be pi, in effect placing all current in the −d direction. This may provide zero torque and in general minimum flux. As a result of the zero-torque reference, in motoring action, the machine will reduce speed, which increases the flux limit and thereby provides a possibility that a new valid point can be found. In generating action, this approach may not work, and the system will rely on other means to reduce the speed such as a mechanical brake. This is a common problem for all field weakening operation.

Figure 10A:
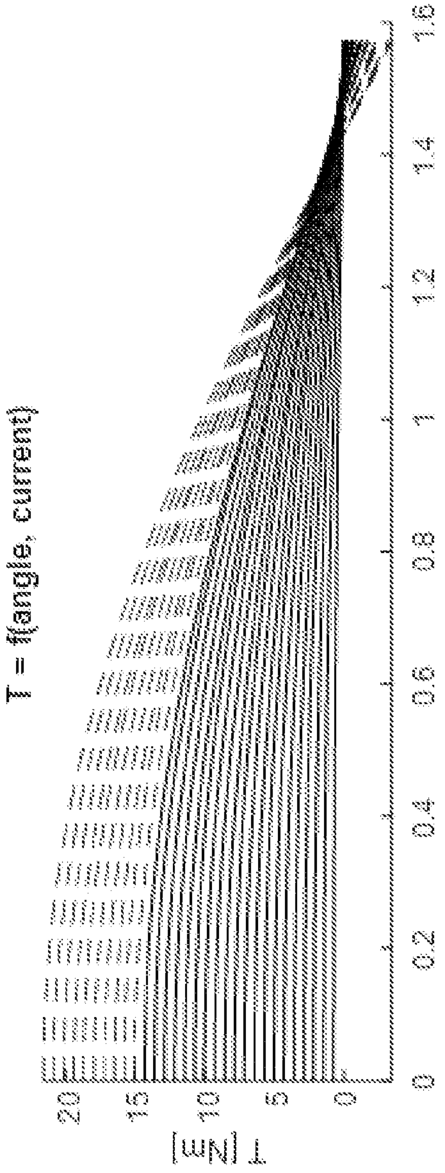
FIGS. 10*a* and 10*b*: examples for cutting output current reference to current limit value.
Figure 10B:
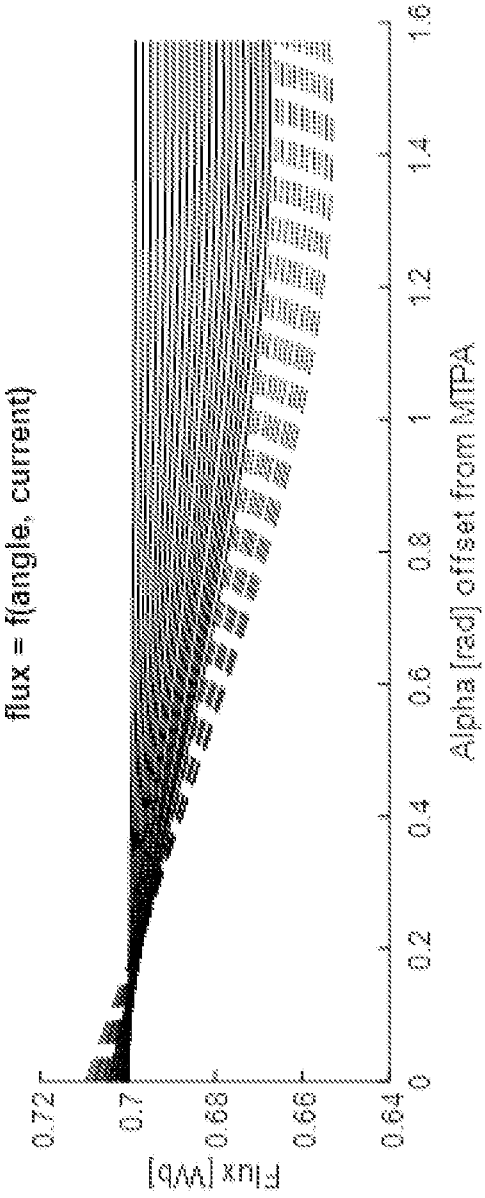

Current limit is handled in a simple way by restricting the available range of the table up to the current value just exceeding the current limit. The corresponding output current reference will be cut to the current limit value afterwards as illustrated in FIGS. 10*a* and 10*b*, where the entire table is defined up to the highest possible current value based on the PowerUnit Data, i.e. hard-ware specific data. The blue part is the available range allowed by the user setting current limit, and the red is thus the restricted part.

The black x in FIG. 10*a* shows the highest possible torque available in the available range of the table and therefore, the torque input must be restricted to this value during e.g. a wind-up situation where the user torque limit is set unrealistically high.

Figure 11:
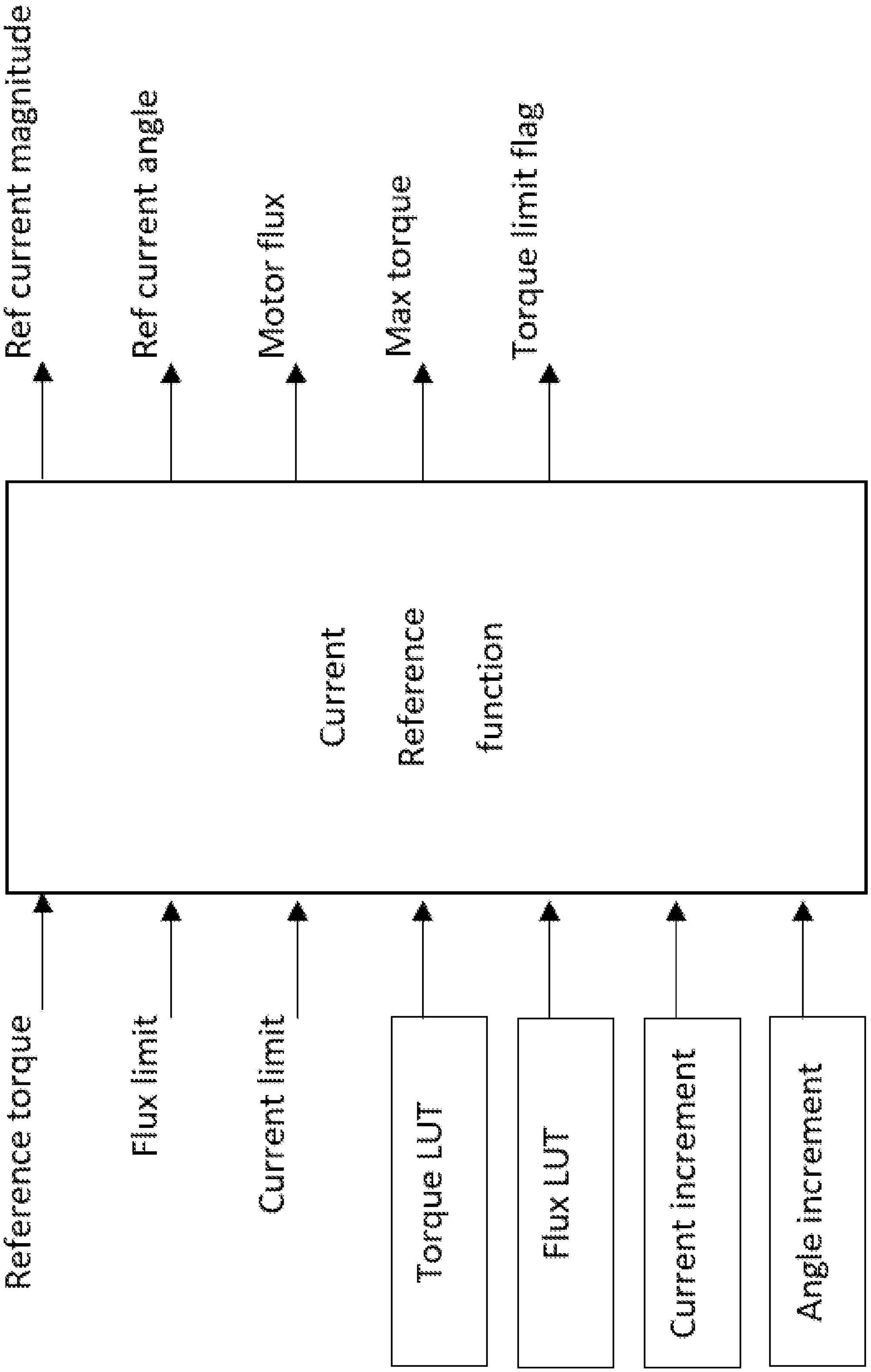
FIG. 11: inputs and outputs of the function.

As a summary to the detailed functionality of the current referencing function, FIG. 11 shows the inputs and outputs of the function and FIG. 12 the corresponding definitions of inputs and outputs. The function itself may be implemented by a corresponding computer program.

Figure 13:
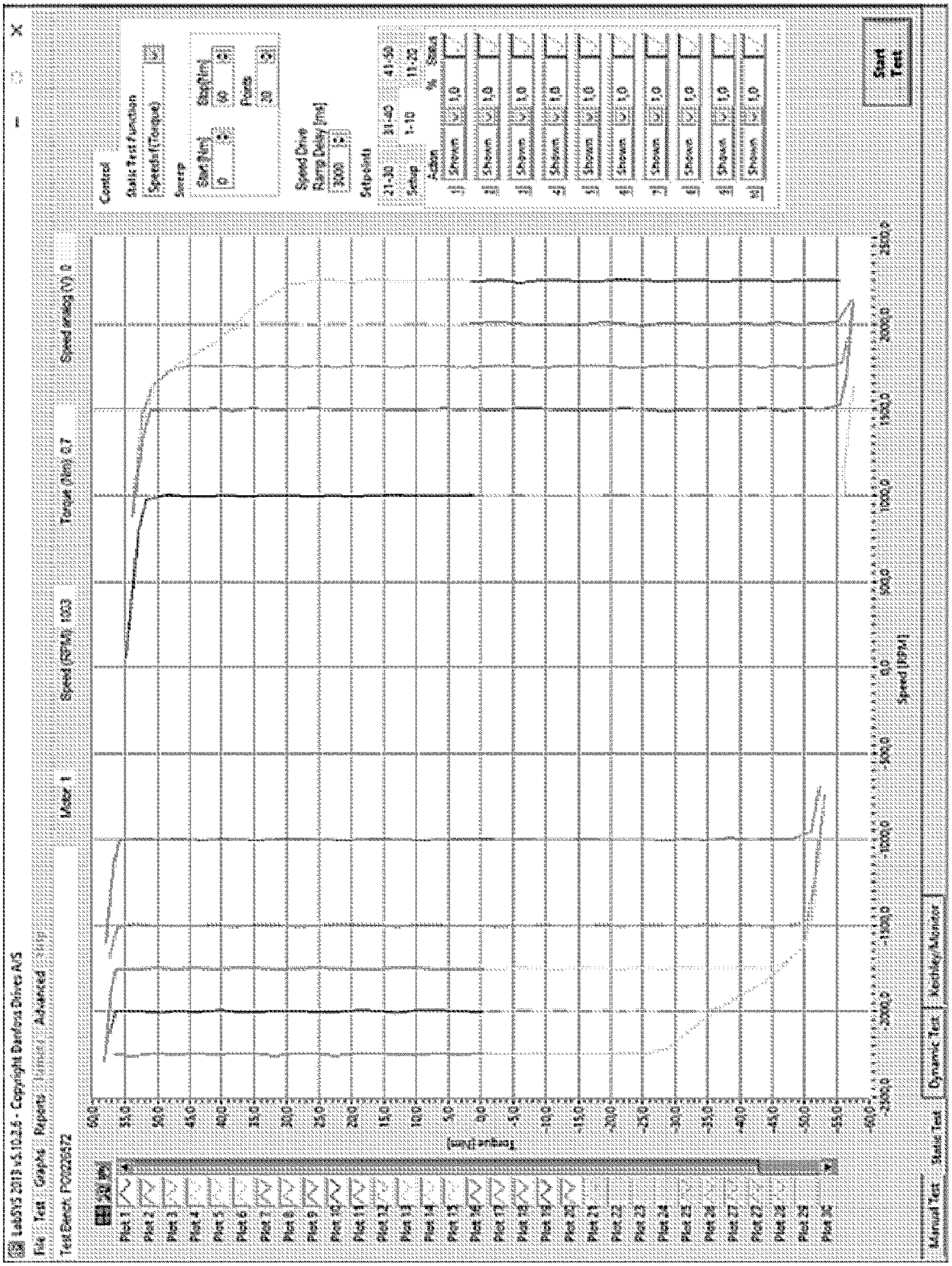
FIG. 13: exemplary 4-quadrant 100% current limit operation of a 7.5 kW IPM machine, running directly with AMA parameters.

FIG. 13 shows an exemplary 4-quadrant 100% current limit operation of a 7.5 kW IPM machine, running directly with AMA parameters and using the presently described method.

The invention can be used with synchronous machines of varying degrees of saliency. In all cases, the presently described method is able to run directly with AMA parameters in deep field weakening and combined with current limit.

The method of the present invention pertains to a general purpose i.e. unified field weakening function for general synchronous motors. The invention may be implemented and tested with various types of electric motors and their drives.

The invention is applicable with any synchronous motor and provides comparable performance characteristics, which only depend on the motor rating. The invention makes it possible to transition seamlessly into and out of field weakening as well as in current limit conditions. The invention may be adapted such that the search for points is improved, e.g. made faster, using binary search or other search methods. It may also be possible to output a more smooth flux value by using interpolation between several points found in the table. All embodiments of the invention may be based on using a predetermined torque and flux table. The invention can be carried out with any possible combination of the presently described features.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for operating a variable speed drive for driving an electric motor, the method comprising:

providing a look-up table for a motor, the look-up table associating torque input values and/or flux input values with current vector control values comprising a current magnitude and a current angle, including values at max torque per ampere (MTPA) points and at angular deviations from the MTPA points;

generating, using the look-up table, a current magnitude and a current angle as control variables as a function of a torque input value and/or a flux input value while maintaining a flux limit; and outputting the generated current magnitude and current angle to control operation of the motor;

wherein generating consecutive current magnitude and current angle values comprises:

storing a current index and an angle index corresponding to a last-used current magnitude and a last-used current angle in the look-up table; and limiting a search for a next current magnitude and a next current angle to a portion of the look-up table around the stored current index and the stored angle index.

2. The method according to claim 1, wherein the output generated current magnitude is smaller than or equal to a current limit and/or that the flux limit is calculated from a motor speed at an available DC link voltage.

3. The method according to claim 1, wherein, if the associated flux values are greater than the flux limit, current magnitude values and current angle values are generated, which correspond to current magnitude values and current angle values at an angular deviation from the MTPA points, at which a torque limit and the flux limit are maintained.

4. The method according to claim 1, wherein the look-up table is an interpolating look-up table referencing torque inputs and flux inputs to reference current vector control values, comprising the current magnitude values and current angle values.

5. The method according to claim 1, wherein the current magnitude values and current angle values at angular deviations from the MTPA points are increased such that for each increment of current magnitude, the current angle is varied in step, wherein the current angle is within a range of 80° to 180°.

6. The method according to claim 1, wherein the generated current magnitude values and generated current angle values are converted into d- and q-axis reference values.

7. The method according to claim 1, wherein the look-up table is created during initialization.

8. The method according to claim 1, wherein the search for the next current magnitude value and current angle value is limited to three current indices below and above and to five angle indices below and above the respective indices of a last-used current magnitude value and current angle value.

9. A variable speed drive for driving an electric motor, the variable speed drive comprising a computation unit and a program for executing the method according to claim 1.

10. The method according to claim 2, wherein, if the associated flux values are greater than the flux limit, current magnitude values and current angle values are generated, which correspond to current magnitude values and current angle values at an angular deviation from the MTPA points, at which a torque limit and the flux limit are maintained.

11. The method according to claim 2, wherein the look-up table is an interpolating look-up table referencing torque inputs and flux inputs to reference current vector control values, comprising the current magnitude values and current angle values.

12. The method according to claim 3, wherein the look-up table is an interpolating look-up table referencing torque inputs and flux inputs to reference current vector control values, comprising the current magnitude values and current angle values.

13. The method according to claim 2, wherein the current magnitude values and current angle values at angular deviations from the MTPA points are increased such that for each increment of current magnitude, the current angle is varied in step, wherein the current angle is within a range of 80° to 180°.

14. The method according to claim 3, wherein the current magnitude values and current angle values at angular deviations from the MTPA points are increased such that for each increment of current magnitude, the current angle is varied in step, wherein the current angle is within a range of 80° to 180°.

15. The method according to claim 4, wherein the current magnitude values and current angle values at angular deviations from the MTPA points are increased such that for each increment of current magnitude, the current angle is varied in step, wherein the current angle is within a range of 80° to 180°.

16. The method according to claim 2, wherein the generated current magnitude values and generated current angle values are converted into d- and q-axis reference values.

17. The method according to claim 3, wherein the generated current magnitude values and generated current angle values are converted into d- and q-axis reference values.

18. The method according to claim 4, wherein the generated current magnitude values and generated current angle values are converted into d- and q-axis reference values.

19. The method according to claim 4, wherein the look-up table is an interpolating look-up table referencing torque inputs and flux inputs from a speed controller of the drive to reference current vector control values, comprising the current magnitude values and current angle values.

20. A method for operating a variable speed drive for driving an electric motor, the method comprising:

providing a look-up table for a motor, the look-up table associating torque input values and/or flux input values with current vector control values comprising a current magnitude and a current angle, including values at max torque per ampere (MTPA) points and at angular deviations from the MTPA points;

generating, using the look-up table, a current magnitude and a current angle as control variables as a function of a torque input value and/or a flux input value while maintaining a flux limit; and outputting the generated current magnitude and current angle to control operation of the motor;

wherein generating consecutive current magnitude and current angle values comprises:

storing a current index and an angle index corresponding to a last-used current magnitude and a last-used current angle in the look-up table; and limiting a search for a next current magnitude and a next current angle to a portion of the look-up table around the stored current index and the stored angle index;

wherein the current magnitude and current angle values at angular deviations from the MTPA points are increased such that for each increment of current magnitude of 2%, the current angle is varied in steps of 1°, wherein the current angle is within a range of 80° to 180°.

* * * * *